US 6,549,345 B1

(12) United States Patent  
Cardarelli

(10) Patent No.: US 6,549,345 B1
(45) Date of Patent: Apr. 15, 2003

(54) MEDICINE BOTTLE MAGNIFYING LENS

(76) Inventor: Venanzio Cardarelli, 20 N. Triangle Dr., Plymouth, MA (US) 02360

( * ) Notice: Subject to any disclaimer, the term of this patent is extended or adjusted under 35 U.S.C. 154(b) by 0 days.

(21) Appl. No.: 10/050,982

(22) Filed: Jan. 18, 2002

Related U.S. Application Data

(60) Provisional application No. 60/262,680, filed on Jan. 22, 2001.

(51) Int. Cl.[7] .............................................. G02B 27/02
(52) U.S. Cl. ...................... 359/802; 359/809; 359/440; 359/441; 359/442; 359/804
(58) Field of Search ................. 359/802, 803, 359/804, 805, 806, 807, 808, 809, 810, 811, 436, 440, 441, 442; D16/134, 135, 136

(56) References Cited

U.S. PATENT DOCUMENTS

| 2,961,108 | A | | 11/1960 | Johnson | |
|---|---|---|---|---|---|
| 5,193,032 | A | * | 3/1993 | Hirth | 359/804 |
| 5,309,279 | A | | 5/1994 | Halstead | |
| 5,760,975 | A | | 6/1998 | DiGiovanni | |
| 6,081,392 | A | * | 6/2000 | Pensmith | 359/802 |
| 6,278,545 | B1 | * | 8/2001 | Napier | 359/440 |
| 6,366,401 | B1 | * | 4/2002 | Gonda et al. | 359/440 |
| 6,386,367 | B1 | * | 5/2002 | Bayliss, IV | 206/534 |

* cited by examiner

Primary Examiner—Georgia Epps
Assistant Examiner—Saeed Seyrafi
(74) Attorney, Agent, or Firm—D. Michael Burns

(57) ABSTRACT

A magnification device for assisting people to read the small print on medicine vials/bottles. The device including a magnifying lens having the ability to move towards or away from the indicia on the bottle to further aid the user to focus per their particular level of eyesight. A pair of rods are coaxial disposed within a corresponding pair of channels to enable the lens to be focused by pushing or pulling the lens. The present invention is designed to be used with virtually all manufactured bottle caps. The device can either be permanently affixed to the bottle cap, and thereby be disposable with the cap; or it can be removably connected and therefore be reusable.

10 Claims, 7 Drawing Sheets

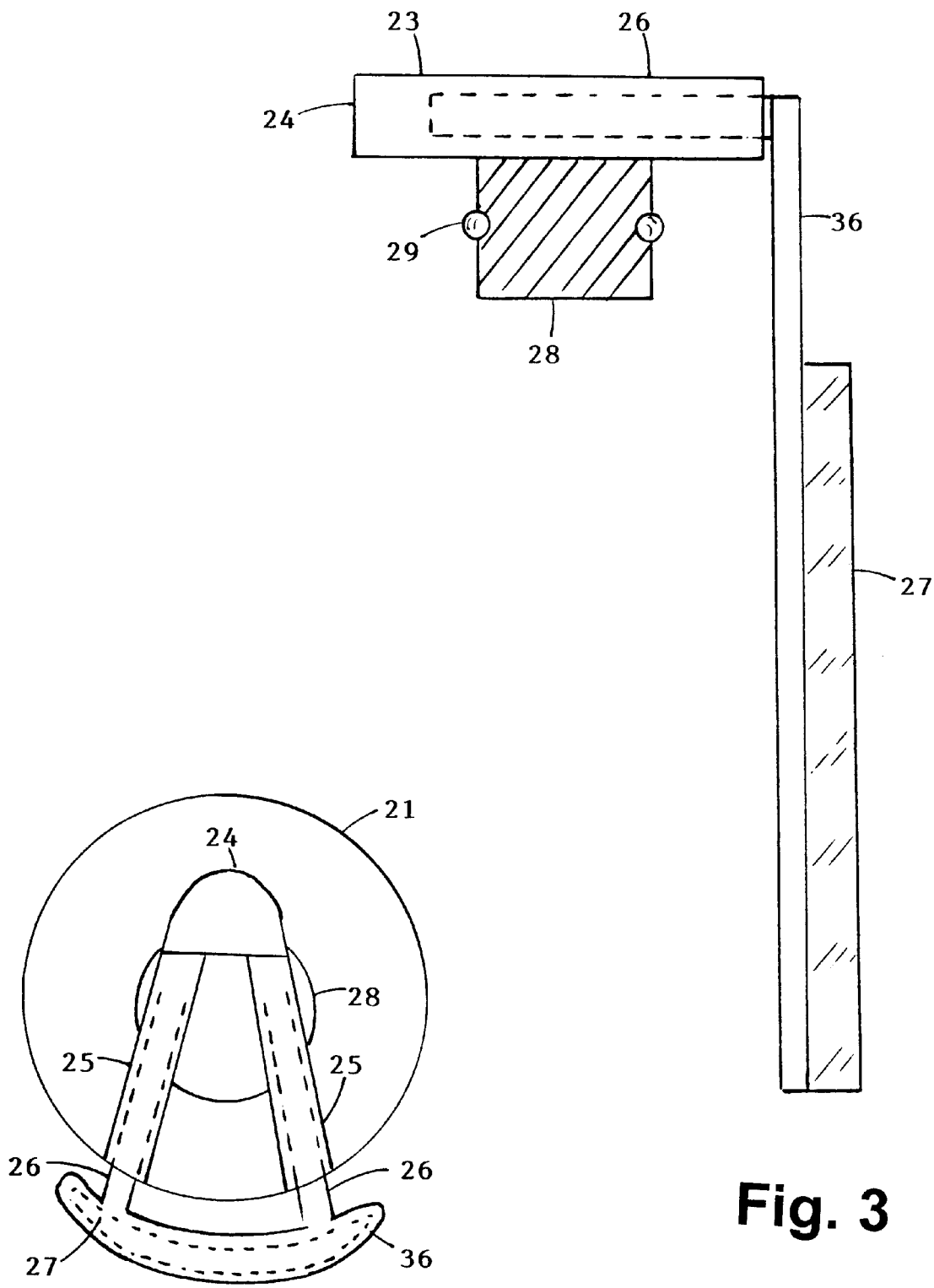

MEDICINE BOTTLE MAGNIFYING LENS

CROSS REFERENCE TO RELATED APPLICATION

This application is based on Provisional Patent Application Ser. No. 60/262,680 filed Jan. 22, 2001.

BACKGROUND OF THE INVENTION

1. Field of the Invention

The present invention relates to a magnification device for bottles, more particularly for a lens having the capability of being moved about the bottle and which can also be focused by the user.

2. Description of the Prior Art

The use of magnification devices for reading indicia on medicine bottles is well know in the prior art. Until recently most devices were not affixed to the bottle; neither were they integrally connected to the bottle cap; and those devices that were affixed did not have the capability of being manipulated into focus.

In the prior art, the most common problem concerned the lens not being adapted to the shape of the bottle, thereby causing distortion of the indicia. Being able to read the small print is becoming a major concern, where in years past it was not that important. In the past the consumer/patient relied upon the advice of his/her doctor for a proper diagnosis of their ailment and also on the professionalism of the pharmacist to dispense the proper medicine. However, with the rising trend of chain store super pharmacies, there is a trend toward less pharmacists anti more assistants and technicians. This is a major problem as cited by the National Academy of Sciences, which estimates that hospital error for medication to surgical mistakes kill 44,000 to 98,000 Americans a year; more than breast cancer or highway accidents. Walgreen, which has filled over 248 million prescriptions, has at least 6,147 dispensing errors resulting in lawsuits. The number of prescriptions in the United States is expected to rise from 2 billion in 1992 to over 4 billion by the year 2005. Meanwhile the number of pharmacists is expected to decline by 25% over the same period. State agencies, in order to control the expected problems, are introducing legislation to control the number of assistants and technicians that a professional pharmacist may supervise. Unlike in the past, where people consulted their doctor more frequently, today more people have adopted a self-health approach. Regardless of whether the ailment is a stomach ache, a headache, fever, cough or flu-like symptoms, today many people will find their remedy in the aisles of their local pharmacy. Obviously, in the future people are going to be more personally responsible for their medicines.

Medicine boxes will frequently list in very large and bold print the symptoms that the enclosed medicine will aid. The "warnings" on these boxes are usually in extremely fine print. The consumer is led to believe that because its in small print that it is not important. The system has moved from a scientific and professionally driven enterprise to a market driven enterprise. Everyone benefits from this invention, because everyone should be aware of the information presented in the small print. The biggest group at risk are senior citizens. With senior citizens making up the largest group of medicine users, and since they are more likely to have poor eyesight, the present invention a long felt need. Magnification devices are known in a large number of variants, particularly those designed for medical bottles. Thus U.S. Pat. No. 5,309,279 issued on May 3, 1994 to Halstead, teaches of a curved convex magnifying device which is slid onto a medicine vial, and the user slides it up or down to read the indicia on the bottle. While the device will self-affix to the bottle, it does not provide for differences in eye sight among users.

One of the first inventions to address the need for magnification of medical bottles was U.S. Pat. No. 2,961,108, which was issued to Johnson on Nov. 22, 1960. Johnson taught the use of a magnifying cap which was integral with the bottle cap, and when uncapped could be used to read the small print. It was not adaptable to the shape of the bottle and it required the cap to be removed for use.

U.S. Pat. No. 5,760,975 issued to DiGiovanni on Jun. 2, 1998, is another example of a magnifying lens that requires the cap to be removed for use. In this invention provision is made for the magnifying device to be used without the gain bottle cap being removed. Again, the contour of the bottle is not addressed, and this invention teaches of a magnifying device which is separate from the bottle. It does address the need to have a device which is adaptable to the shape of the bottle.

None of the above inventions and patents, either singly or in combination, is seen to describe the instant invention as claimed.

SUMMARY OF THE INVENTION

Accordingly, the above problems and difficulties are obviated by the present invention which provides for an improved magnification device for reading medicine bottles. More particularly, it provides for a magnification device that is affixed to the bottle itself; can provide access to indicia anywhere on the bottle; and which can be focused to the individual eye sight of the user.

The present invention provides for a magnifying lens which is affixed to the cap of a medicine bottle. It has channels whereby rods are interposed coaxial therein, and which can be either pulled out or pushed in depending on the focus required by the user. Magnification is achieved through the use of a converging or convex lens, usually thicker in the middle and thinner at the edges. As depicted in the drawings, the lens shown is of a semi-lunar shape, but it is recognized that the shape of the lens is not to be restricted to only this lens shape. The lens itself can be the length of the bottle or else it can be a portion of the length, and therein slide up or down within an encasement. The most important provision of the present invention is the ability to rotate the lens completely around the perimeter of the bottle.

It is an object of the present invention to provide a new and improved magnification device for reading indicia of the side of a medicine bottle. This is particularly important for very fine print which so often is the way the "warnings" are listed.

It is another object of the present invention to provide a new and improved magnification device which can easily be adapted to any type of medicine bottle cap, whether that be a cap that rotates 360°, a cap that is depressed into a slot or a cap that is of a non-rotary design.

It is yet still another object of the invention that the proper magnification lens be used for the desired purpose which is to avoid distortions.

It is another object of the present invention that the device be capable of 360° rotation therefore affording the capability to read indicia around the entire bottle.

Still another object of the present invention is that the device have the ability to move towards or away from the indicia to allow the user to more clearly focus on the small print.

And still another object of the invention is that the device be capable of being removed from one bottle and used on another, thereby offering reusability, flexibility and lower costs.

It is yet a final object of the invention that the materials of manufacture and the design of the device itself be economical to therefore not lose any competitive edge.

An additional object of the invention is that the device be adaptable to all shapes of bottles, and not merely limited to round shapes.

These and other objects of the present invention will become readily apparent upon further review of the following specification and drawings.

BRIEF DESCRIPTION OF THE DRAWINGS

The foregoing objects and other features of the invention will become readily apparent and may be understood by referring to the following detailed description of an illustrative preferred embodiment of the medicine bottle magnifying lens with the ability to rotate 360°; be focused towards or away from the indicia; and be capable of affixing to any type of medical bottle.

FIG. 3 is an elevational view of the device isolated from the bottle.

FIG. 4 is a top view of the device of FIG. 1, depicting the channels and rods integral with an encasement, which allow the lens to move towards and away from the bottle.

DETAILED DESCRIPTION OF THE PREFERRED EMBODIMENT

Figure 1:
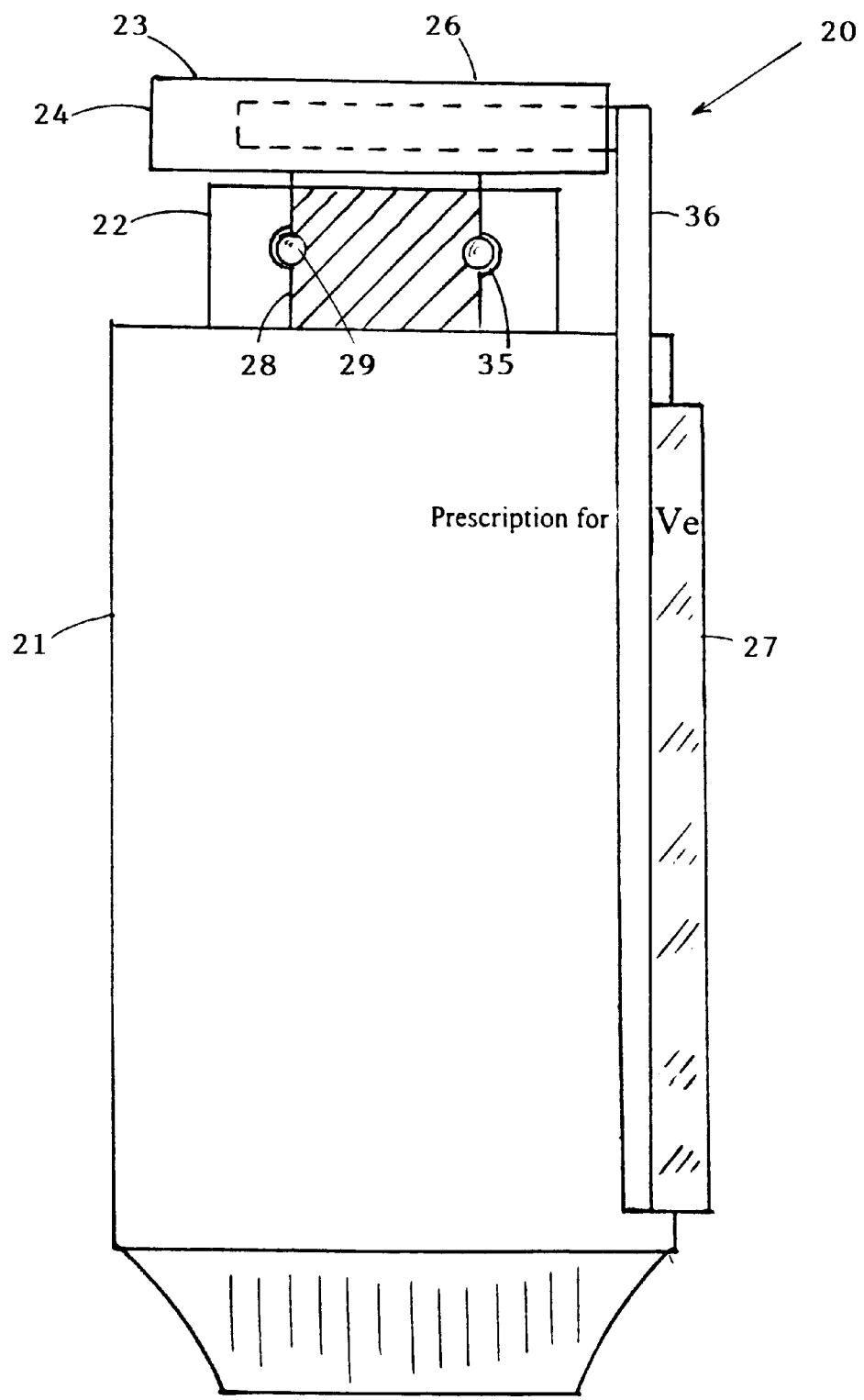
FIG. 1 is an elevational, partial cross-sectional view of the device of the present invention as installed on a medicine bottle.

The magnifying lens device, which is generally designated by the reference number 20, is shown in FIGS. 1–8 thereof, and embodies the principles and concepts of the new and improved present invention.

Particularly, the various figures denote the device 20 to be a magnification lens which is attached or substituted for the cap of a medicine bottle/vial. This is a long felt need for those people who need assistance in reading the often life threatening small print on the sides of such bottles. More specifically, the device 20 consists of a bottle 21; a removable bottle cap portion 22; a support frame 23 which includes an end portion 24 that serves as a counterweight; a pair of channels 25; a pair of circularly shaped rods 26 longitudinally and coaxially disposed within the channels 25 for an "in and out" movement therein; and a magnification lens 27 housed within an encasement 36 integral with the distal ends of the rods 26.

Figure 2:
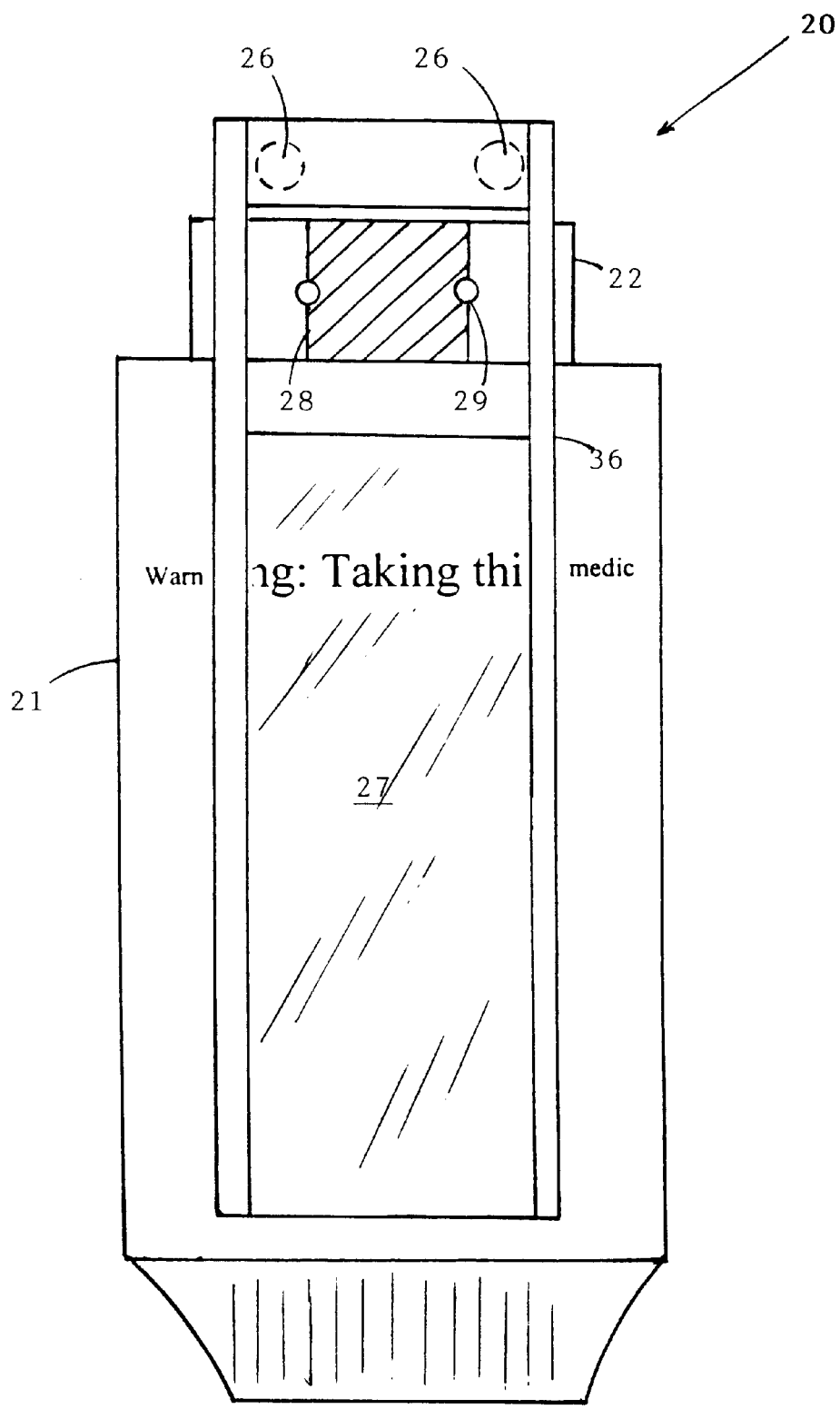
FIG. 2 is a side view of the device depicted in FIG. 1 in which one possible construction of the channel and rod is shown.
Figure 5:
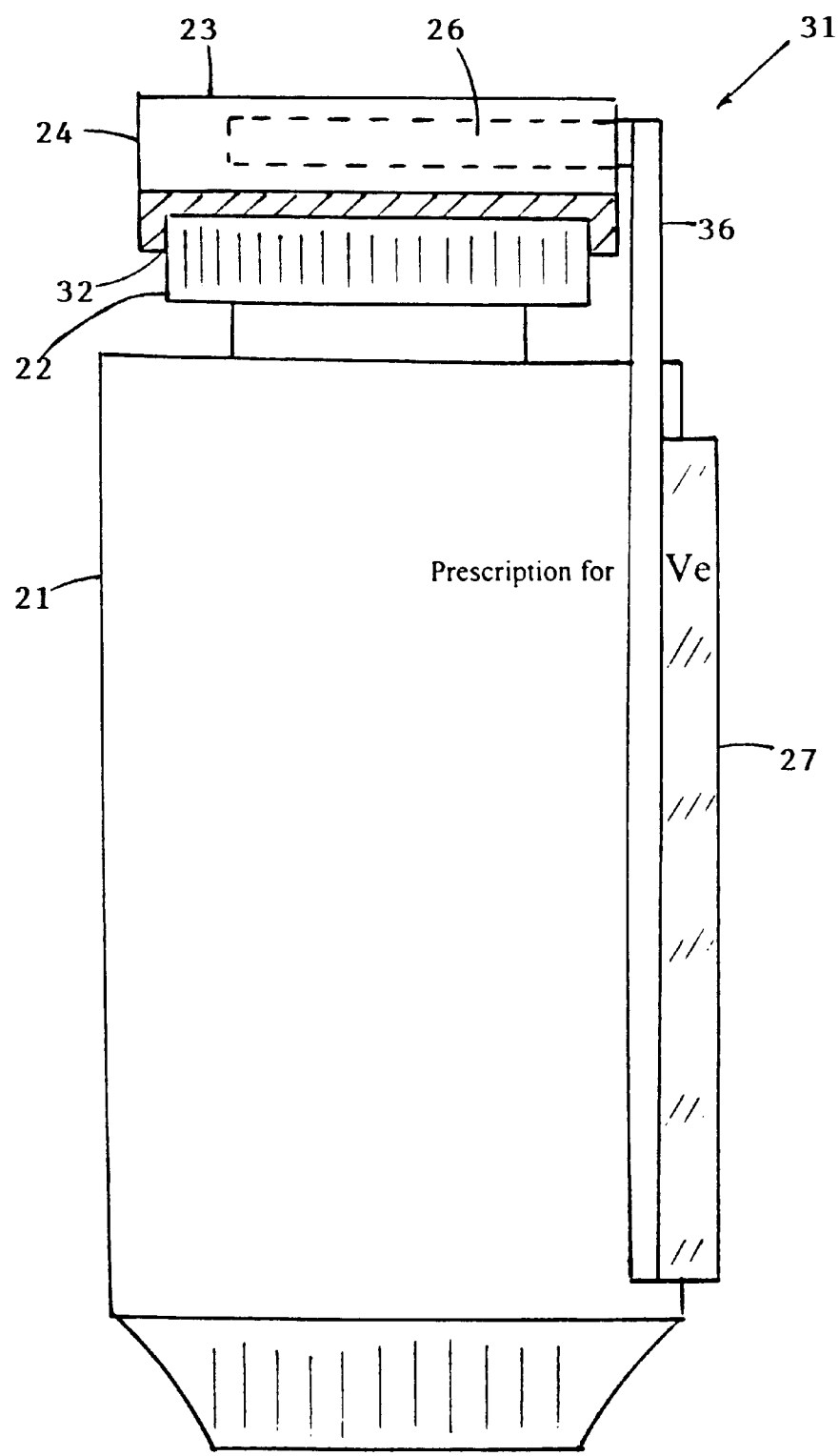
FIG. 5 is an elevational view of the preferred embodiment affixed to a rotating type cap in an overlap design.

Device 20 has an insert section 28 integral with support frame 23, as shown in FIGS. 1–3, wherein device 20 is snapped into the normal bottle cap portion 22. The means for the present invention to snap into bottle cap portion 22 is by lining up a pair of spherical bearings 29 (either movable as bearings or immovable as spherical ball projections) to be inserted into a pair of prefabricated slots (not shown) in cap 22. Cap 22 will also have a circular inner ring 35, whereby the ball bearing 29 will be able to freely move therein, thereby allowing support frame 23 to rotate 360° about bottle 21. The inventive concept of device 20 is best exemplified by the ability of lens 27 to move closer or further from the small print indicia in order to allow the user to get in better focus, as different people will have varying degrees of eyesight. To enable magnification lens 27 to move in and out, the circular shaped rods 26 slide in a longitudinally manner within channels 25 as best shown in FIG. 4. In the preferred embodiment, magnification lens 27 is of a length, whereby the entire side of bottle 21 can be read. It is to be appreciated that in lieu of the circular shaped rods 26 and channels 25, they could assume a variety of shapes such as round, semi-lunar, oval, or kidney, without varying from the design concept. Magnification lens 27 can be attached to frame 23 by a number of conventional means, however, the present invention will house the lens 27 within encasement 36 that may of itself be of indeterminable length, which would be determined by the amount of coverage desired on the bottle 21. The material of construction will preferably be of resin plastic or glass, with the preferred material being plastic for costs and safety considerations.

Medicine bottles generally are manufactured in three basic types. The first is the type wherein the user lines up a pair of matching arrows and snaps off the cap. The second is where the cap is strictly a simple snap-off type. And the third is the rotating type wherein the cap is allowed to rotate freely and when the user desires to open the bottle, they merely press down and turn the cap. Device 20 described above, with the insert section 28, is basically designed for the first two types. For the third type, there is no need to design rotation into the device 20 as bottle cap 22 will of itself provide for free rotation. For this type of bottle cap 22, an alternate embodiment of the present invention is disclosed in FIG. 5. This embodiment consists of an adjustable snap-on device 31, which has a hollow sleeve 32 that is friction-fitted over the bottle cap 22. This eliminates the insert section 28 and would be a less expensive modification, however, it can only be adapted to the rotating type bottle caps 22.

Figure 6:
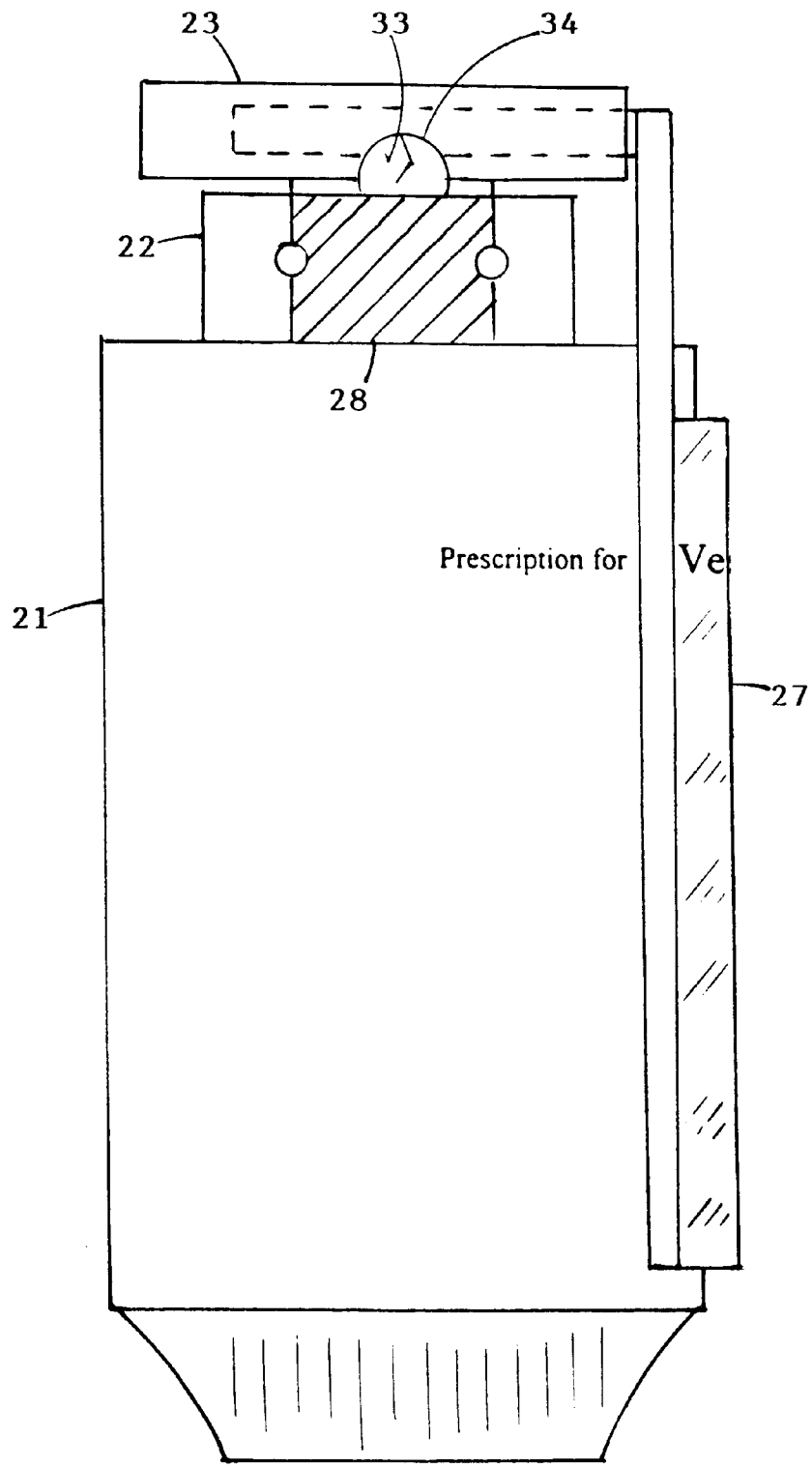
FIG. 6 is an elevational view of an embodiment depicting a removably affixed cap having a snap-in design.

Another modification of the present invention is shown in FIG. 6, wherein insert section 28 includes a compressible and resilient spherical ball 33 located on the upper part of insert section 28. Support frame 23 is not herein integral with the insert section 28, but rather has a spherical cavity 34 of a size and shape to accept the spherical ball 33 in a removably rotatable connection. This embodiment would allow the user to easily remove device 20 for use on other bottles having similar spherical ball designs. In this embodiment the ball bearings 29 would not rotate within a circular inner ring 35, but rather provide for a snap-in retention of the embodiment.

Figure 7:
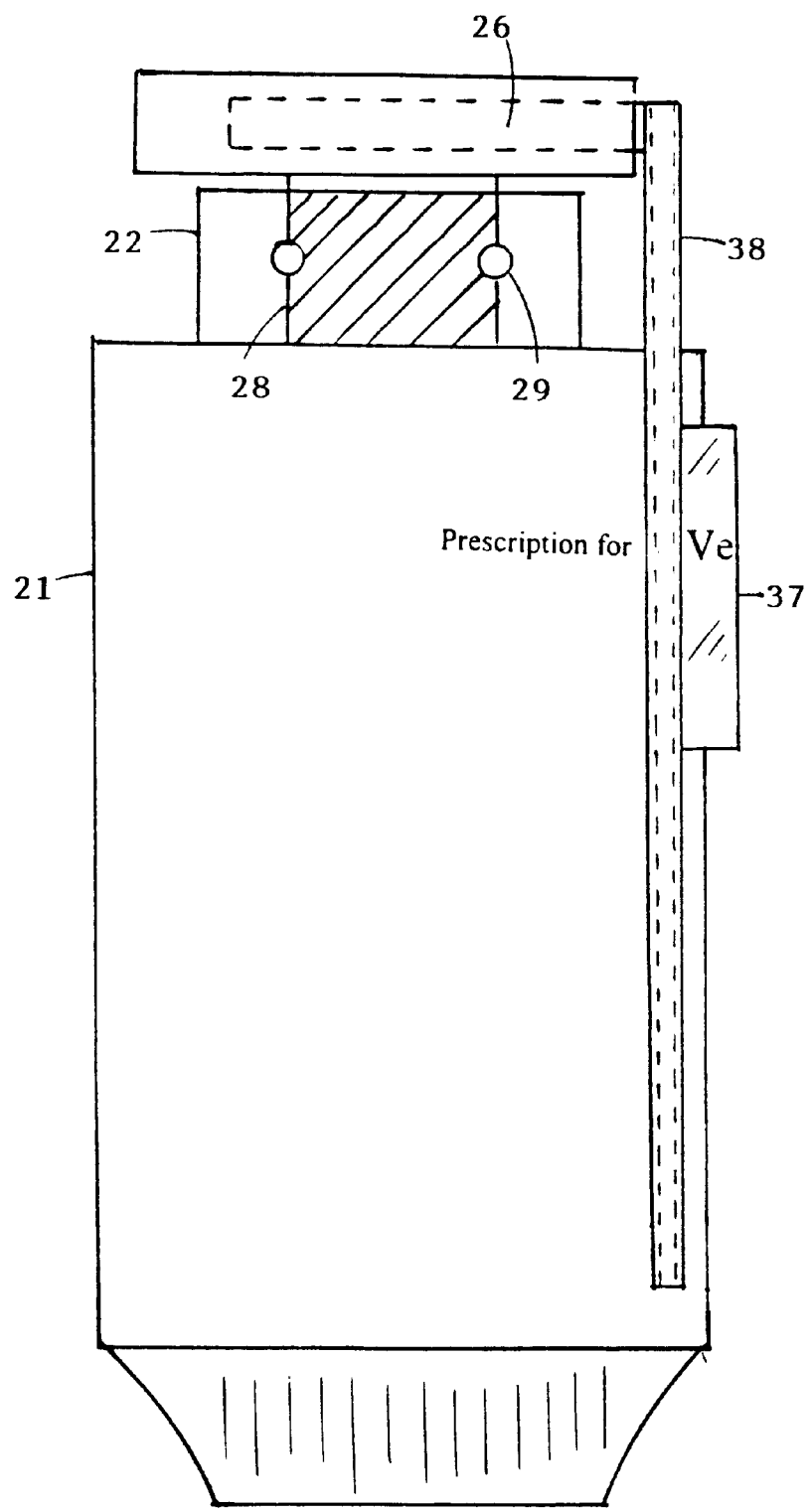
FIG. 7 is an elevational view of an alternative embodiment, whereby the lens is but a portion af the size of the bottle, and in which the lens slides up or down within its encasement.
Figure 8:
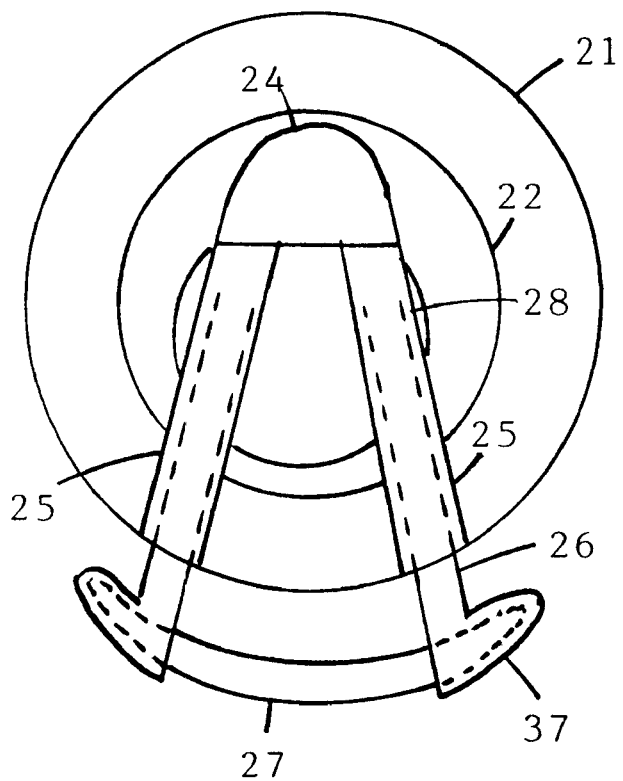
FIG. 8 is a top view of FIG. 7.

FIGS. 7 and 8 depict yet another modification of the present invention, wherein magnification leis 27 is replaced by a sliding lens 37. Sliding lens 37 is but a smaller version of the above described versions, which in order to enable the user to read the indicia for the entire bottle 21, needs the ability to slide either up or down within an encasement 38. The encasement 38 being integral with rods 26 but not with the sliding lens 37. The encasement 38 has the ability of being folded to reduce packaging space and make packaging simpler and more affordable. It also has the flexibility of being adjusted to the length of the bottle.

While this invention has been primarily shown and described with reference to the preferred embodiments thereof, it will be understood by those skilled in the art that various changes in form and details may be made therein without departing from the spirit and scope of the invention as defined by the appended claims.

What is claimed is:

1. A medicine bottle magnification device, the device comprising:

a bottle containing small print indicia on its surface and having a removable cap;

a support frame having means for rotationally attaching to the cap;

the support frame having defined therein a pair of channels;

a pair of rods coaxial and transversely disposed within the channels, the rods slidable within the channels, the rods having distal ends thereof;

an encasement integral with the distal ends of the rods; and a magnifying lens seated within the encasement, whereby, an individual can rotate the lens to any location on the bottle and may focus the indicia to their particular eyesight level by adjusting the distance of the lens to the indicia by sliding the encasement within the channels.

2. The device according to claim 1, wherein the rotational attaching means of the frame to the cap comprises:

the cap having an inner surface defining a circular opening, a circular cavity defined in the inner surface;

an insert section on the lower portion of the frame for snap fitting into the circular opening of the cap, the insert section having a plurality of spherical bearings for rotational seating within the circular cavity, whereby the frame can rotate 360 degrees about the bottle.

3. The device according to claim 1, wherein the lens is made of a glass material.

4. The device according to claim 1, wherein the lens is made of a plastic material.

5. The device according to claim 1, wherein the rotational attaching means of the frame to the cap comprises:

the cap having a compressibly resilient spherical ball mounted on its upper surface;

the frame having a spherical cavity for friction-fitting over the ball, whereby the frame can rotate 360 degrees about the ball.

6. The device according to claim 1, wherein the encasement further includes:

an elongated body extending down along the surface of the bottle, whereby the lens is free to slide not only in and away from the bottle surface, but also up and down the bottle surface.

7. A medicine bottle magnification device, the device comprising:

a bottle containing small print indicia on its surface and having a rotatable cap;

the cap having means for rotating 360 degrees about the bottle;

a support frame having means for attaching to the cap for 360 degree rotation;

the support frame having defined therein a pair of channels;

a pair of rods coaxial and transversely disposed within the channels, the rods slidable within the channels, the rods having distal ends thereof;

an encasement integral with the distal ends of the rods; and a magnifying lens seated within the encasement, whereby, an individual can rotate the lens to any location on the bottle and may focus the indicia to their particular eyesight level by adjusting the distance of the lens to the indicia by sliding the encasement within the channels.

8. The device according to claim 7, wherein the attaching means of the frame to the cap comprises the frame having an opening generally corresponding to the size of the cap for friction-fitting the frame over the cap.

9. The device according to claim 7, wherein the lens is made of a glass material.

10. The device according to claim 7, wherein the lens is made of a plastic material.

* * * * *